(12) United States Patent
Nakamura et al.

(10) Patent No.: US 11,364,868 B2
(45) Date of Patent: Jun. 21, 2022

(54) VEHICLE CONTROL SYSTEM AND VEHICLE CONTROL METHOD

(71) Applicant: HONDA MOTOR CO., LTD., Tokyo (JP)

(72) Inventors: Mitsuyoshi Nakamura, Tokyo (JP); Kenya Sakurai, Tokyo (JP); Takashi Fukahori, Tokyo (JP); Hiroyuki Hazawa, Tokyo (JP); Yuji Tsuchiya, Wako (JP); Yoko Ishihara, Tokyo (JP); Shinsuke Kandaka, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/329,509

(22) Filed: May 25, 2021

(65) Prior Publication Data

US 2021/0370860 A1 Dec. 2, 2021

(30) Foreign Application Priority Data

May 27, 2020 (JP) .............................. JP2020-092577

(51) Int. Cl.
*B60R 21/015* (2006.01)
*G08B 21/24* (2006.01)
*G08B 21/02* (2006.01)
*G06V 20/59* (2022.01)
*G06V 40/10* (2022.01)

(52) U.S. Cl.
CPC .. *B60R 21/01538* (2014.10); *B60R 21/01542* (2014.10); *G06V 20/59* (2022.01); *G06V 40/10* (2022.01); *G08B 21/02* (2013.01); *G08B 21/24* (2013.01)

(58) Field of Classification Search
CPC ........ B60R 21/01538; B60R 21/01542; G06K 9/00362; G06K 9/00832; G08B 21/02; G08B 21/24; G08B 21/22; G06V 20/59; G06V 40/10; G06V 20/593; G06V 40/103; B60Q 9/00
See application file for complete search history.

(56) References Cited

U.S. PATENT DOCUMENTS

| | | | |
|---|---|---|---|
| 9,847,004 B1* | 12/2017 | Lan | G08B 21/24 |
| 10,515,535 B1* | 12/2019 | Dhullipala Chenchu | G06T 7/97 |
| 10,850,709 B1* | 12/2020 | Nagata | G07C 9/00563 |
| 2006/0103529 A1* | 5/2006 | Ohmura | B60R 25/1001 340/687 |
| 2006/0254142 A1* | 11/2006 | Das | B60R 21/013 49/26 |

(Continued)

FOREIGN PATENT DOCUMENTS

| | | |
|---|---|---|
| JP | 2006-159939 | 6/2006 |
| JP | 2015-209154 | 11/2015 |

*Primary Examiner* — Brian Wilson
(74) *Attorney, Agent, or Firm* — Rankin, Hill & Clark LLP

(57) ABSTRACT

As described above, in a vehicle control system, in a predetermined condition where a vehicle peripheral condition recognizing unit recognizes a condition where a first user who has been in a vehicle leaves the vehicle and where an in-vehicle condition recognizing unit recognizes a condition where a second user is present in the vehicle, an alarm control unit performs alarm processing on at least one of inside the vehicle and outside the vehicle by using a notification function of the vehicle according to a detection result of a door open/close detection unit.

7 Claims, 10 Drawing Sheets

(56) References Cited

U.S. PATENT DOCUMENTS

2014/0300461 A1* 10/2014 Stark .................. G08B 21/02
340/457

* cited by examiner

FIG.3

| REGISTERED USER (NAME) | USER AUTHENTICATION DATA | ATTRIBUTE | | CONTACT INFORMATION | ADMINISTRATOR INFORMATION |
|---|---|---|---|---|---|
| | | AGE | CLASSIFICATION | | |
| USER 1 | DATA1 | 37 | ADULT | MAIL1 | NO SETTING |
| USER 2 | DATA2 | 35 | ADULT | MAIL2 | NO SETTING |
| USER 3 | DATA3 | 6 | CHILD | MAIL3 | USER 1, USER 2 |

83

VEHICLE CONTROL SYSTEM AND VEHICLE CONTROL METHOD

INCORPORATION BY REFERENCE

The present application claims priority under 35 U.S.C. § 119 to Japanese Patent Application No. 2020-092577 filed on May 27, 2020. The content of the application is incorporated herein by reference in its entirety.

BACKGROUND

Technical Field

The present invention relates to a vehicle control system and a vehicle control method.

Related Art

There is known a notification device which, when detecting that a child is left in a vehicle by an in-vehicle camera or an infrared sensor, notifies an occupant outside the vehicle by using any one of a speaker of the vehicle, a head lamp, and a tail lamp (for example, see JP 2006-159939 A). In addition, there is known an on-vehicle alarm device which, when detecting a behavior of an occupant in a vehicle who is attempting to open a door, makes notification of an approach of a vehicle on the rear side, a two-wheeled vehicle, or the like (for example, see JP 2015-209154 A).

SUMMARY

When a child gets on a vehicle, it is desirable not only to deal with a situation where the child is left in the vehicle, but also to deal with various situations such as the child jumping out of an open door when getting off the vehicle.

However, neither JP 2006-159939 A nor JP 2015-209154 A can deal with various situations as described above. For example, the technique disclosed in JP 2006-159939 A cannot change alarm processing in response to a situation where a child left in the vehicle is likely to jump out of the vehicle. In the technique disclosed in JP 2015-209154, notification of the approach of other vehicles is uniformly made to an in-vehicle user, and there is a possibility that an alarm is given even though the notification of the approach is unnecessary depending on the situation of an occupant.

The present invention has been made in view of such a background, and it is an object of the present invention to enable a more suitable alarm when a child or the like gets on a vehicle.

A first aspect for achieving the above object is a vehicle control system that controls operation of a vehicle having a notification function, and the vehicle control system includes a vehicle peripheral condition recognizing unit that recognizes a condition around the vehicle, an in-vehicle condition recognizing unit that recognizes a condition inside the vehicle, a door open/close detection unit that detects an open/close state of a door of the vehicle, and an alarm control unit that performs alarm processing on at least one of inside the vehicle and outside the vehicle by using the notification function according to a detection result of the door open/close detection unit in a predetermined condition where a first user who has been in the vehicle leaves the vehicle is recognized by the vehicle peripheral condition recognizing unit and where a condition where a second user is present in the vehicle is recognized by the in-vehicle condition recognizing unit.

In the vehicle control system, the in-vehicle condition recognizing unit may have a getting-off intention recognizing part that recognizes a getting-off intention of the second user in the vehicle, and in the predetermined condition, when an open state of the door is detected by the door open/close detection unit and when the getting-off intention of the second user is recognized by the getting-off intention recognizing part, the alarm control unit may perform first alarm processing including an alarm directed to the second user.

In the vehicle control system, the in-vehicle condition recognizing unit may have a locking state detection part that detects locking/unlocking of the door, and in the predetermined condition, when a close state of the door is detected by the door open/close detection unit and when the locking state of the door is detected by the locking state detection part, the alarm control unit may perform second alarm processing including an alarm directed to the first user.

In the vehicle control system, in the predetermined condition, when the close state of the door is detected by the door open/close detection unit and when the locking state detection part detects that the door is changed from the locking state to the unlocking state, the alarm control unit may perform third alarm processing including an alarm directed to the second user.

In the vehicle control system, the third alarm processing may include processing of guiding, to the second user, a getting-off position set based on at least a recognition result of the vehicle peripheral condition recognizing unit.

The vehicle control system includes a door control unit that controls an operating component associated with the door, and in the predetermined condition, when an approach of an alarm target object is detected by the vehicle peripheral condition recognizing unit, the alarm control unit may perform fourth alarm processing corresponding to the approach, and the door control unit may control the door to at least one of the close state and the locking state.

The vehicle control system may include a communication part capable of communicating with a portable terminal of the second user, and the second alarm processing or the third alarm processing may include processing of transmitting alarm information to the portable terminal of the second user by the communication part.

A second aspect for achieving the above object is a vehicle control method executed by a computer to control operation of a vehicle having a notification function, and the vehicle control method includes a vehicle peripheral condition recognition step of recognizing a condition around the vehicle by a vehicle peripheral condition recognizing unit, an in-vehicle condition recognition step of recognizing a condition inside the vehicle by an in-vehicle condition recognizing unit, a door open/close detection step of detecting an open/close state of a door of the vehicle by a door open/close detection unit, and an alarm control step of performing alarm processing on at least one of inside the vehicle and outside the vehicle by using the notification function according to a detection result of the door open/close detection step in a predetermined condition where a first user who has been in the vehicle leaves the vehicle is recognized in the vehicle peripheral condition recognition step and where a condition where a second user is present in the vehicle is recognized in the in-vehicle condition recognition step.

The present invention enables a more suitable alarm when a child or the like gets on a vehicle.

BRIEF DESCRIPTION OF DRAWINGS

FIG. 3 is a diagram showing an example of user information;

DETAILED DESCRIPTION

An embodiment of the present invention is hereinafter described with reference to the drawings.

Figure 1:
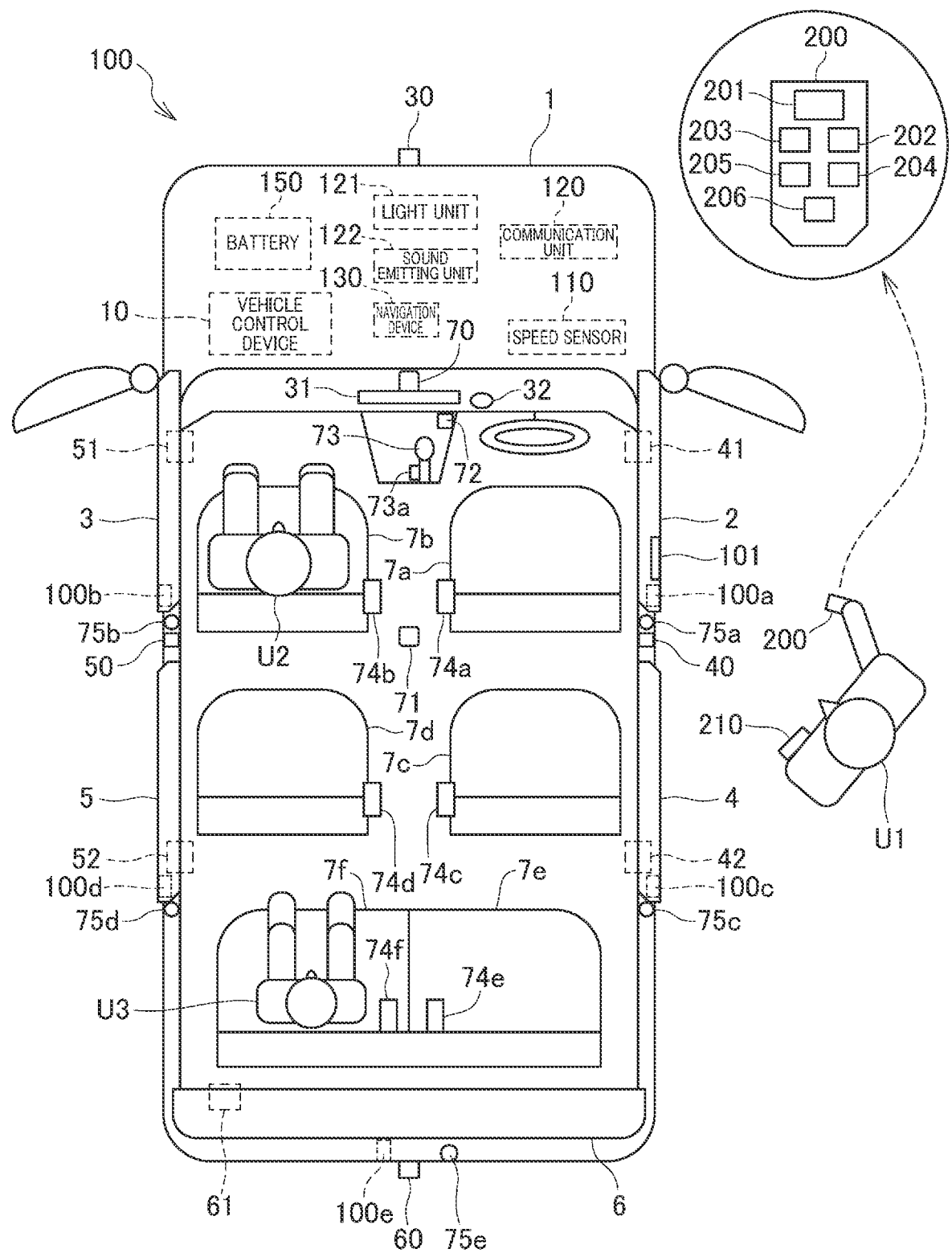
FIG. 1 is a configuration diagram of a vehicle in which a vehicle control system is mounted.

FIG. 1 is a diagram showing a configuration of a vehicle on which a vehicle control system according to the embodiment of the present invention is mounted. The vehicle control system 100 is constituted of a vehicle control device 10 provided in a vehicle 1, after-mentioned sensors and control target parts which are provided in the vehicle 1 and electrically connected to the vehicle control device 20, and the like.

[1. Vehicle Configuration]

Referring to FIG. 1, a configuration of the vehicle 1 on which the vehicle control device 10 of the present embodiment is mounted will be described. As shown in FIG. 1, the vehicle 1 is a passenger car carrying six persons and includes a driver seat 7a, a passenger seat 7b, a second row right seat 7c, a second row left seat 7d, a third row right seat 7e, and a third row left seat 7f. The seats 7a to 7f are provided respectively with seat belt switches 74a to 74f that detect whether or not a seat belt (not shown) is worn.

The vehicle 1 includes a right power hinged door 2, a left power hinged door 3, a right power slide door 4, a left power slide door 5, and a power tail gate 6. The right power hinged door 2, the left power hinged door 3, the right power slide door 4, the left power slide door 5, and the power tail gate 6 correspond to the door of the present invention. A door knob of the right power hinged door 2 is provided with a door touch sensor 101, and a user U1 having a portable key 200 of the vehicle 1 can unlock the doors 2 to 5 of the vehicle 1 by touching the door touch sensor 101.

FIG. 1 illustrates a case where a user U2 is seated in the passenger seat 7b of the vehicle 1 and a user U3 is seated in the third row left seat 7f For example, the user U3 is a child, and the users U1 and U2 are parents of the user U3.

The right power hinged door 2 includes a right power hinged door (PHD) driving part 41 that opens, closes, and drives the right power hinged door 2 by an electric actuator (not shown), and the left power hinged door 3 includes a left PHD driving part 51 that opens, closes, and drives the left power hinged door 3 by the electric actuator. The right power slide door 4 includes a right power slide door (PSD) driving part 42 that opens, closes, and drives the right power slide door 4 by the electric actuator, and the left power slide door 5 includes a left PSD driving part 52 that opens, closes, and drives the left power slide door 5 by the electric actuator. The power tail gate 6 includes a power tail gate (PTG) driving part 61 that opens, closes, and drives the power tail gate 6 by the electric actuator.

A front part of the vehicle 1 is provided with a front camera 30 that photographs a forward sight of the vehicle 1, and a rear part of the vehicle 1 is provided with a rear camera 60 that photographs a rearward sight of the vehicle 1. A right side portion of the vehicle 1 is provided with a right side camera 40 that photographs a right sight of the vehicle 1, and a left side portion of the vehicle 1 is provided with a left side camera 50 that photographs a left sight of the vehicle 1. Images of people around the vehicle 1 can be acquired by these cameras 30 to 60. The users of the vehicle 1 include a wide range of persons using the vehicle 1, are not limited to an owner of the vehicle 1, for example, and include a family member and an acquaintance of the owner. In the following description, when it is necessary to give a distinct description according to the fact that the user of the vehicle 1 is inside or outside the vehicle, the user inside the vehicle is indicated as "in-vehicle user", and the user outside the vehicle is appropriately indicated as "off-vehicle user".

A dashboard of a cabin compartment is provided with a front seat camera 70 capable of photographing the in-vehicle users seated in the driver seat 7a and the passenger seat 7b, a display 31, and a speaker 32. A ceiling of the cabin compartment is provided with a rear seat camera 71 capable of photographing the in-vehicle users seated in the second row right seat 7c, the second row left seat 7d, the third row right seat 7e, and the third row left seat 7f. The speaker 32 is also provided at a position in the vehicle 1 other than the dashboard, and these speakers 32 can output sound to all the in-vehicle users seated in the respective seats 7a to 7f.

The doors 2 to 5 are provided respectively with door switches 75a to 75d that detect opening and closing of the respective doors. The power tail gate 6 is provided with a door switch 75e that detects opening and closing of the power tail gate 6. In addition, a power switch 72 for giving an instruction on on and off of a battery 150 and a shift switch 73a that detects a shift position of a shift lever 73 are provided near the driver seat 7a. When the battery 150 is on, power is supplied from the battery 150 to a vehicle drive system or the like, and when the battery 150 is off, the power supply from the battery 150 to the vehicle drive system or the like is cut off.

The vehicle 1 further includes door lock mechanisms 100a to 100e that lock the doors 2 to 5 and the power tail gate 6, respectively, a speed sensor 110 that detects a traveling speed of the vehicle 1, a communication unit 120 capable of communicating with the portable key 200, the portable terminal 210 of the user U1, and the like, a light unit 121 capable of outputting light to the outside of the vehicle, a sound emitting unit 122 capable of outputting sound to the outside of the vehicle, and a navigation device 130. The navigation device 130 has a processor, a global positioning system (GPS) sensor, and map data (not shown). The navigation device 130 performs, by the function of the processor, route guidance to a destination or the like based on the position of the vehicle 1 detected by the GPS sensor and the map data.

Under a control of the vehicle control device 10, the communication unit 120 functions as a communication part that transmits an electronic mail or the like to any device having a communication function including the portable terminal 210. The light unit 121 includes a headlight, a position lamp, a blinker lamp, etc., is used during traveling, and can notify the periphery of the vehicle 1 of the position, the presence, etc., of the own vehicle by being driven for light emission by the vehicle control device 10. The light unit 121 may have a presentation light that illuminates the outside of the vehicle (for example, under a side mirror) when an occupant gets on or off the vehicle. The sound emitting unit 122 includes the speaker 32 and a horn, and under the control of the vehicle control device 10, various sounds such as artificial sounds are output from the speaker 32, or the horn is operated, so that the sound can be reported inside and outside the vehicle. Known sound output devices can be widely applied to the sound emitting unit 122, and the sound emitting unit 122 may have, for example, an interactive sound system.

By using the communication unit 120, the light unit 121, and the sound emitting unit 122, information can be reported inside and outside the vehicle. That is, the communication unit 120, the light unit 121, and the sound emitting unit 122 also function as a notification unit that realizes a notification function to the inside and outside of the vehicle. In the present embodiment, the notification unit is used to perform various kinds of warnings. Electrical components shown in FIGS. 1 and 2 including the notification unit are vehicle electrical components previously installed in the vehicle 1. However, the present invention is not limited to the vehicle electrical component, and may include so-called retrofitted electrical components.

[2. Configuration of Vehicle Control Device]

Figure 2:
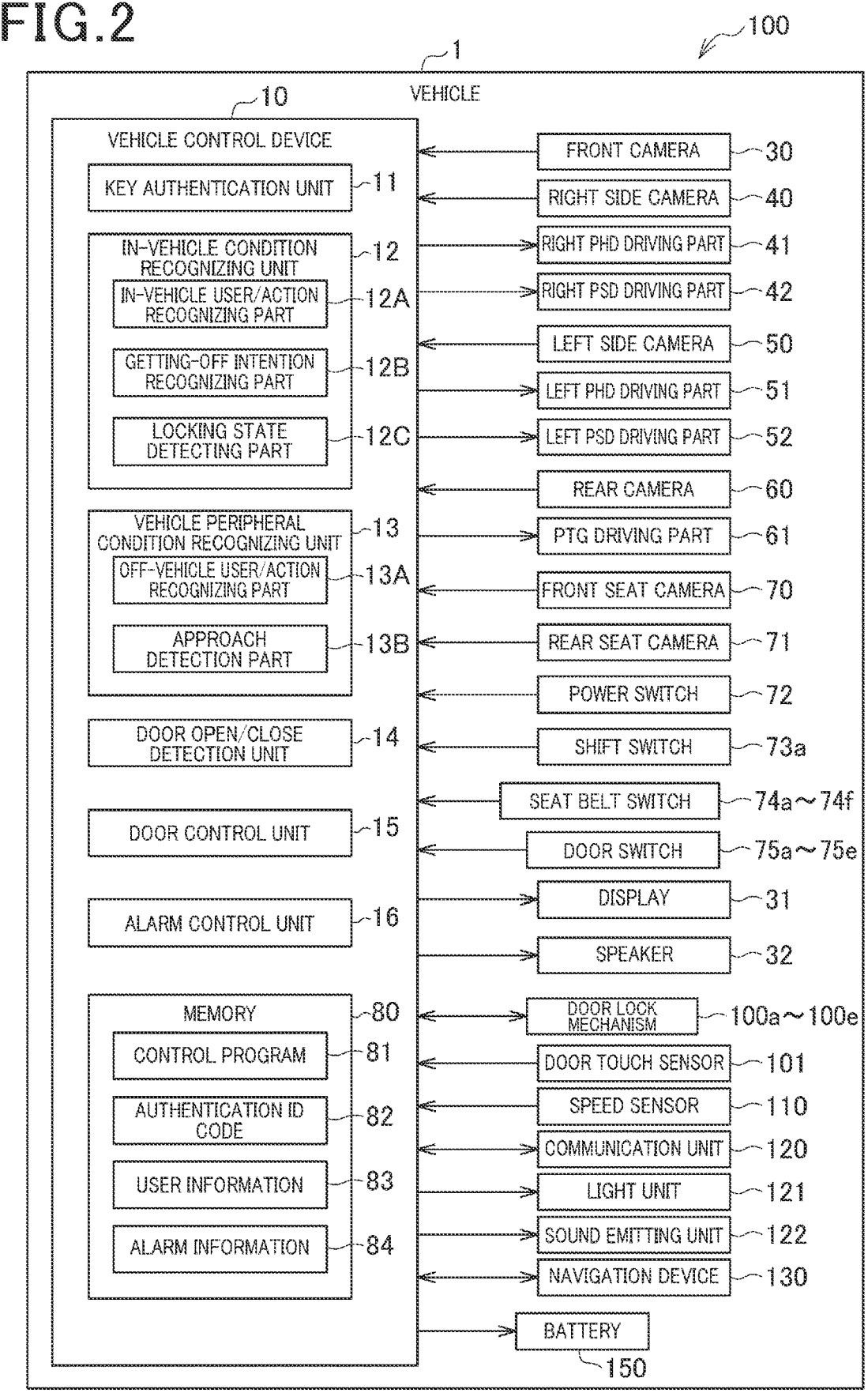
FIG. 2 is a configuration diagram of a vehicle control apparatus.

Referring to FIG. 2, a configuration of the vehicle control device 10 will be described. The vehicle control device 10 is constituted of a processor (CPU: central processing unit) that corresponding to the computer of the present invention (not shown), a memory 80, an interface circuit (not shown), and the like, and is an electronic control unit (ECU) that controls the operation of the vehicle 1.

To the vehicle control device 10, images around the vehicle 1 taken by the front camera 30, the right side camera 40, the left side camera 50, and the rear camera 60 are input. Further, to the vehicle control device 10, images of the inside of the cabin compartment taken by the front seat camera 70 and the rear seat camera 71 are input.

Further, to the vehicle control device 10, detection signals from the power switch 72, the shift switch 73a, the seat belt switches 74a to 74f, and the door switches 75a to 75e, and lock detection signals from the doors 2 to 5 and the power tail gate 6 by door lock sensors (not shown) provided in the door lock mechanisms 100a to 100e are input.

Furthermore, to the vehicle control device 10, a touch detection signal from the door touch sensor 101, a speed detection signal from the speed sensor 110, and information on a current position of the vehicle 1 detected by the navigation device 130 are input.

A control signal output from the vehicle control device 10 controls the operation of a right PHD driving part 41, a right PSD driving part 42, the left PHD driving part 51, the left PSD driving part 52, a PTG driving part 61, the door lock mechanisms 100a to 100e, and the battery 150. Furthermore, the control signal output from the vehicle control device 10 controls a screen display of the display 31 and the sound (voice guidance, chime sound, alarm, etc.) output from the speaker 32. The vehicle control device 10 communicates, via the communication unit 120, with the portable key 200 possessed by the user U1 and the portable terminal 210.

The CPU reads and executes a control program 81 of the vehicle control device 10, which is stored in the memory 80, to function as a key authentication unit 11, an in-vehicle condition recognizing unit 12, a vehicle peripheral condition recognizing unit 13, a door open/close detection unit 14, a door control unit 15, and an alarm control unit 16. The control program 81 includes a vehicle control program of the present invention. The memory 80 stores an authentication ID code 82 used for authentication of the portable key 200, user information 83, alarm information 84 used for alarm processing, and the like.

The authentication ID code 82 is a code that specifies the portable key 200 associated with the vehicle 1. The user information 83 includes information on a user who frequently uses the vehicle 1 (including, for example, a family living with the user U1 without limited to the information on the user U1). The number of users may be one. The user information 83 is used for identification of the in-vehicle user and the off-vehicle user.

FIG. 3 shows an example of the user information 83.

The user information 83 is information relating to a regular user registered as a user of the vehicle 1, and FIG. 3 shows a case where information on three regular users 1 to 3 is stored. The user information 83 stores, for example, a name of the regular user, user authentication data, attributes, contact information, and administrator information that allows for specification of the administrator (also refer to as the guardian). Although the authentication data is a face image used for personal authentication or feature data of a face, the authentication data may be other information capable of personal authentication. The authentication data may be stored as data independent of the user information 83 in the memory 80.

The attributes include, for example, age and classification (describing whether it is adult or child), whether the regular user is an adult or a child can be specified based on the classification, and, in addition, information showing whether the regular user is an infant or a baby can be specified by considering the age. The contact information is contact information which can be accessed using communication and is a telephone number, an address of a mail which can be received by a portable terminal of each user, or the like.

The administrator information is, for example, information on the name or contact information of a guardian (parent, representative of parent, etc.) of the regular user as the administrator of the regular user. In the present embodiment, when the regular user is a child, the contact information of the child in an emergency is stored as the administrator information.

By using the user information 83, the regular user is specified, and when the regular user is a child, an electronic mail or the like can be transmitted to the administrator of the child. The user information 83 may be information directly input by the regular user or the like, or may be information in which information stored in a portable terminal or the like of each regular user is prepared from information acquired via the communication unit 120 or the like.

The alarm information 84 is information relating to alarm contents and the like, and is, for example, text information indicating the alarm contents. The alarm contents and the like may be made editable by a user. The contents of the alarm information 84 may be described in the control program 81.

As shown in FIG. 1, when the user U1 having the portable key 200 approaches the vehicle 1, the key authentication unit 11 communicates with the portable key 200 via the communication unit 120 to receive an ID code from the portable key 200. Then, the key authentication unit 11 permits the user U1 to use the vehicle 1 when the received ID code matches the authentication ID code 82 stored in the memory 80.

As shown in FIG. 1, the portable key 200 includes a locking/unlocking button 201 for giving an instruction for locking and unlocking of the vehicle 1, a right power hinged door button 202 for giving an instruction for opening and closing of the right power hinged door 2, a left power hinged door button 203 for giving an instruction for opening and closing of the left power hinged door 3, a right power slide door button 204 for giving an instruction for opening and closing of the right power slide door 4, a left power slide door button 205 for giving an instruction for opening and closing of the left power slide door 5, and a power tail gate button 206 for giving an instruction for opening and closing of the power tail gate 6. Hereinafter, the right power hinged door 2, the left power hinged door 3, the right power slide door 4, the left power slide door 5, and the power tail gate 6 are collectively referred to as electric doors.

The user U1 operates the locking/unlocking button 201 of the portable key 200 to unlock each of the doors 2 to 5 of the vehicle 1, and can get on the vehicle 1. The user U1 can instruct the vehicle 1 to open and close the electric door by operating the buttons 202 to 206 of the portable key 200. The user U1 who has got on the vehicle 1 with the portable key 200 turns on the power switch 72 to start the vehicle 1 and starts using the vehicle 1.

An in-vehicle condition recognizing unit 12 recognizes the condition in the vehicle 1 based on an image imaged by an in-vehicle photographing camera including the front seat camera 70 and the rear seat camera 71. The CPU, as function of the in-vehicle condition recognizing unit 12, further functions as an in-vehicle user/action recognizing part 12A, a getting-off intention recognizing part 12B, and a locking state detection part 12C. The in-vehicle user/action recognizing part 12A recognizes the in-vehicle user based on the images imaged by the front seat camera 70 and the rear seat camera 71, and recognizes an action of the recognized in-vehicle user.

For example, regarding the recognition of the in-vehicle user, the face of the in-vehicle user is recognized from the images taken by the in-vehicle cameras 70 and 71, and based on each authentication data in the user information 83, whether or not the in-vehicle user is the regular user is specified by using a known face authentication technique. Other authentication techniques such as iris authentication may be applied instead of face authentication. When the in-vehicle user is the regular user, whether or not the in-vehicle user is a child or an adult is specified based on the user information 83. When the in-vehicle user is not the regular user, it is possible to specify whether or not the in-vehicle user is a child or an adult based on an image of the in-vehicle user.

In the recognition of the action of the in-vehicle user, a motion of the upper body including the face, hands, and arms of the in-vehicle user is recognized from a taken image by using a known image recognition technology, and various actions such as the face direction, the line of sight, and the movement of the in-vehicle user are recognized. This recognition of the action can specify whether or not the in-vehicle user has moved the vehicle 1 or has gotten off the vehicle 1.

The getting-off intention recognizing part 12B recognizes a getting-off intention from the vehicle 1 of the in-vehicle user based on the action of the in-vehicle user recognized by the in-vehicle user/action recognizing part 12A. For example, the getting-off intention recognizing part 12B recognizes the getting-off intention of the in-vehicle user when it is recognized that the in-vehicle user's line of sight is directed to one of the doors 2 to 5 or the open door of the doors 2 to 5 and when the action in which the in-vehicle user moves toward the door to which the in-vehicle user's line of sight is directed is recognized. When it is recognized that the in-vehicle user has stood up, the getting-off intention of the in-vehicle user may be recognized. The fact that the in-vehicle user has stood up may be detected by a seat sensor (also referred to as seating sensor) provided in each of the seats 7a to 7f. The locking state detection part 12C obtains operating states of the door lock mechanisms 100a to 100e to detect locking/unlocking (locking and unlocking) of each of the doors 2 to 5.

The vehicle peripheral condition recognizing unit 13 recognizes a peripheral condition of the vehicle 1 based on an image taken by an off-vehicle photographing camera including the front camera 30, the right side camera 40, the left side camera 50, and the rear camera 60. The CPU, as function of the vehicle peripheral condition recognizing unit 13, further functions as an off-vehicle user/action recognizing part 13A and an approach detection part 13B. The off-vehicle user/action recognizing part 13A recognizes the off-vehicle user based on the images imaged by the off-vehicle photographing cameras 30 to 60, and recognizes an action of the recognized off-vehicle user.

For example, regarding the recognition of the off-vehicle user, the face of the off-vehicle user is recognized from the images imaged on the front, rear, right, and left sides of the vehicle 1, and based on each authentication data in the user information 83, whether or not the off-vehicle user is the regular user is specified by using a known face authentication technique. Other authentication techniques such as iris authentication may be applied instead of face authentication. When the off-vehicle user is the regular user, whether or not the off-vehicle user is a child or an adult is specified based on the user information 83, and when the off-vehicle user is not the regular user, whether or not the off-vehicle user is a child or an adult can be specified based on an image of the off-vehicle user.

In the recognition of the action of the off-vehicle user, a motion of the upper body including the face, hands, and arms of the off-vehicle user is recognized from a taken image by using a known image recognition technology, and various actions such as the face direction, the line of sight, and the movement of the off-vehicle user are recognized. The off-vehicle photographing cameras 30 to 60 can photograph up to dozens of meters ahead of the vehicle 1, and can recognize whether or not the off-vehicle user has left the vehicle 1. The recognition of the action of the off-vehicle user makes it possible to specify whether or not the user who has been in the vehicle 1 has gotten off the vehicle 1 and is in a first condition where the user has left the vehicle 1. A range in which the off-vehicle user is recognized can be changed appropriately. Known recognition techniques can be widely applied to recognition techniques for the in-vehicle user, the off-vehicle user, and the like.

The approach detection part 13B detects whether or not an alarm target object approaches based on the images imaged by the off-vehicle photographing cameras 30 to 60. The alarm target object is another vehicle such as a four-wheeled vehicle or a two-wheeled vehicle approaching the vehicle 1, a pedestrian, or the like. The approach detection part 13B may detect the alarm target object using various known devices such as a millimeter wave radar.

The door open/close detection unit 14 detects open/close states of the doors 2 to 5 based on operating states of the door switches 75a to 75d. The door control unit 15 controls each of the right PHD driving part 41, the right PSD driving part 42, the left PHD driving part 51, the left PSD driving part 52, the PTG driving part 61, and the door lock mechanisms 100a to 100e and thereby controls operating components associated with the doors 2 to 5.

The alarm control unit 16 performs alarm control toward the inside and outside of the vehicle by using the display 31, the speaker 32, the communication unit 120, the light unit 121, and the sound emitting unit 122. Furthermore, the alarm control unit 16 has a getting-off position specifying function of specifying a suitable position for the in-vehicle user to get off the vehicle based on a recognition result of the vehicle peripheral condition recognizing unit 13 and a function of specifying the presence of other vehicles adjacent to the getting-off position. For example, the alarm control unit 16 can specify a sidewalk side as the getting-off position when the vehicle peripheral condition recognizing unit 13 recognizes the sidewalk, or can specify an opposite side of a side through which the alarm target object passes as the getting-off position when the approach detection part 13B detects the approach of the alarm target object. When the getting-off position is specified, the position of the in-vehicle user may be taken into consideration.

The alarm control performed by the alarm control unit 16 includes a first alarm control and a second alarm control performed when the in-vehicle user gets off the vehicle. The user of the vehicle 1 can appropriately select which of the first alarm control or the second alarm control is executed. Each alarm control may be started according to a user's instruction, or may be automatically executed when the vehicle 1 enters a parking state (for example, a shift position is at a parking position).

[3. First Alarm Control]

Figure 4:
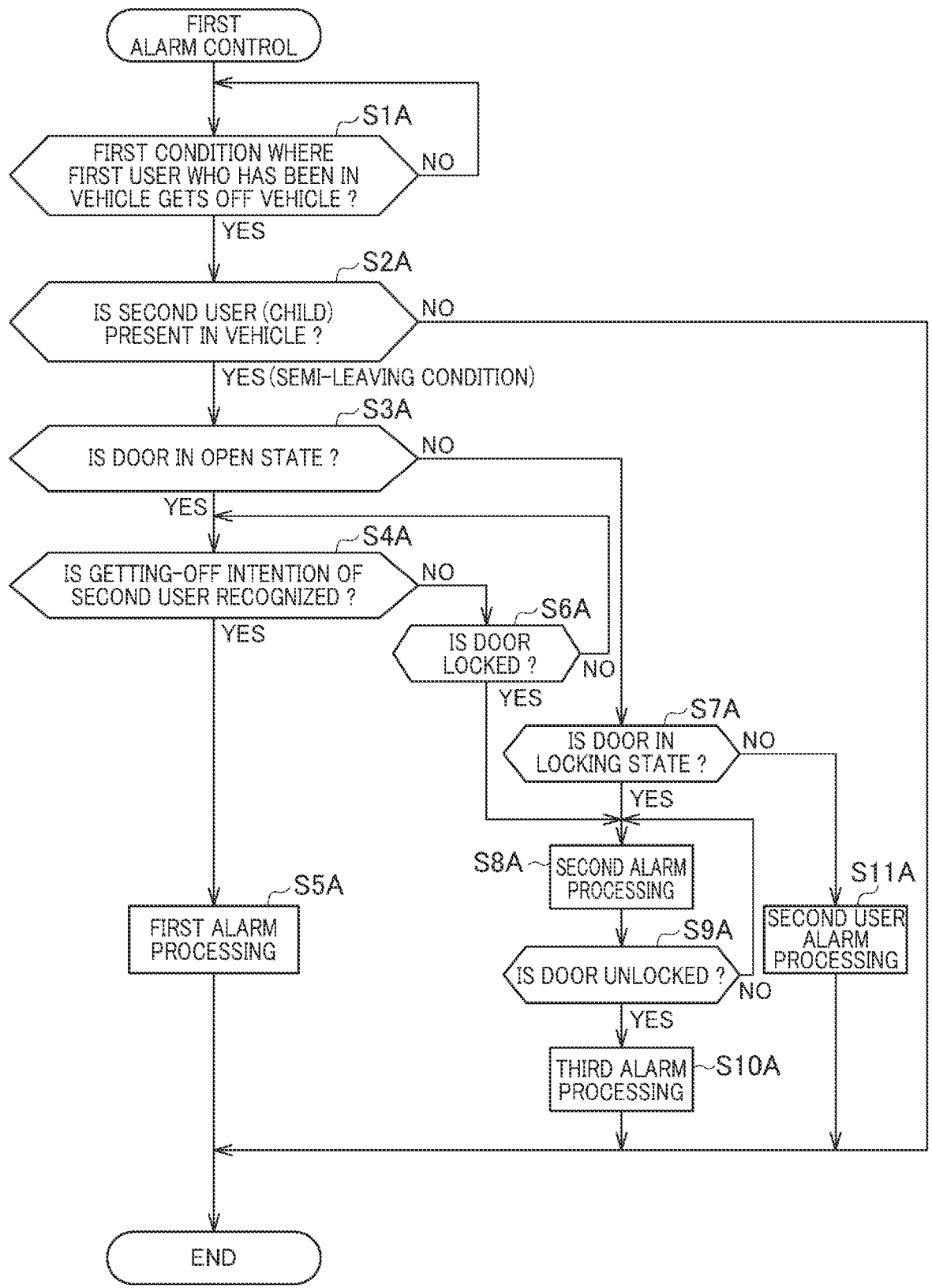
FIG. 4 is a flowchart showing a first alarm control.

FIG. 4 is a flowchart showing the first alarm control. FIGS. 5 to 8 are diagrams for explaining the first alarm control. When the first alarm control or the second alarm control is started, photographing by the off-vehicle photographing cameras 30 to 60 and the in-vehicle photographing cameras 70 and 71 is started, and recognition processing by the in-vehicle condition recognizing unit 12 and the vehicle peripheral condition recognizing unit 13 is started.

First, the alarm control unit 16 continuously monitors, by the vehicle peripheral condition recognizing unit 13, whether or not the condition is the first condition where the first user who has been in the vehicle 1 leaves the vehicle 1 (step S1A). Here, the first user includes at least the in-vehicle user seated in the driver seat 7a. For example, when the in-vehicle user seated in the driver seat 7a leaves the vehicle 1 by a predetermined distance or more (for example, several meters or more), the process proceeds to the next step S2A.

When all of the adult in-vehicle users (including an occupant of the driver seat 7a) getting on the vehicle 1 leave the vehicle 1 by a predetermined distance or more, the process may proceed to the next step S2A.

When whether or not the first user is an adult is specified, if the first user is a previously registered regular user, the age of the first user may be specified from the user information 83 of the regular user, and whether or not the first user is an adult may be specified from the age. When the first user is not the regular user, whether or not the first user is an adult may be specified by using a known age estimation technique or the like.

In step S2A, the alarm control unit 16 uses the in-vehicle condition recognizing unit 12 to determine whether or not a second user is present in the vehicle 1. Here, the second user is a child who is likely to jump out of one of the open doors 2 to 5 or a user who is not preferable to be left in a vehicle, and in the present embodiment, a child who is a baby or an infant (for example, 0 to 6 years old) is assumed. Whether or not the in-vehicle user is a baby or the like may be specified from the user information 83 if the in-vehicle user is the regular user, and if the in-vehicle user is not the regular user, the specification may be performed using a known age estimation technique or the like.

A range of the second user (excluding drivers) may be appropriately set by the user of the vehicle 1 (for example, the first user), and the second user may include elderlies or users of all ages.

Figure 5:
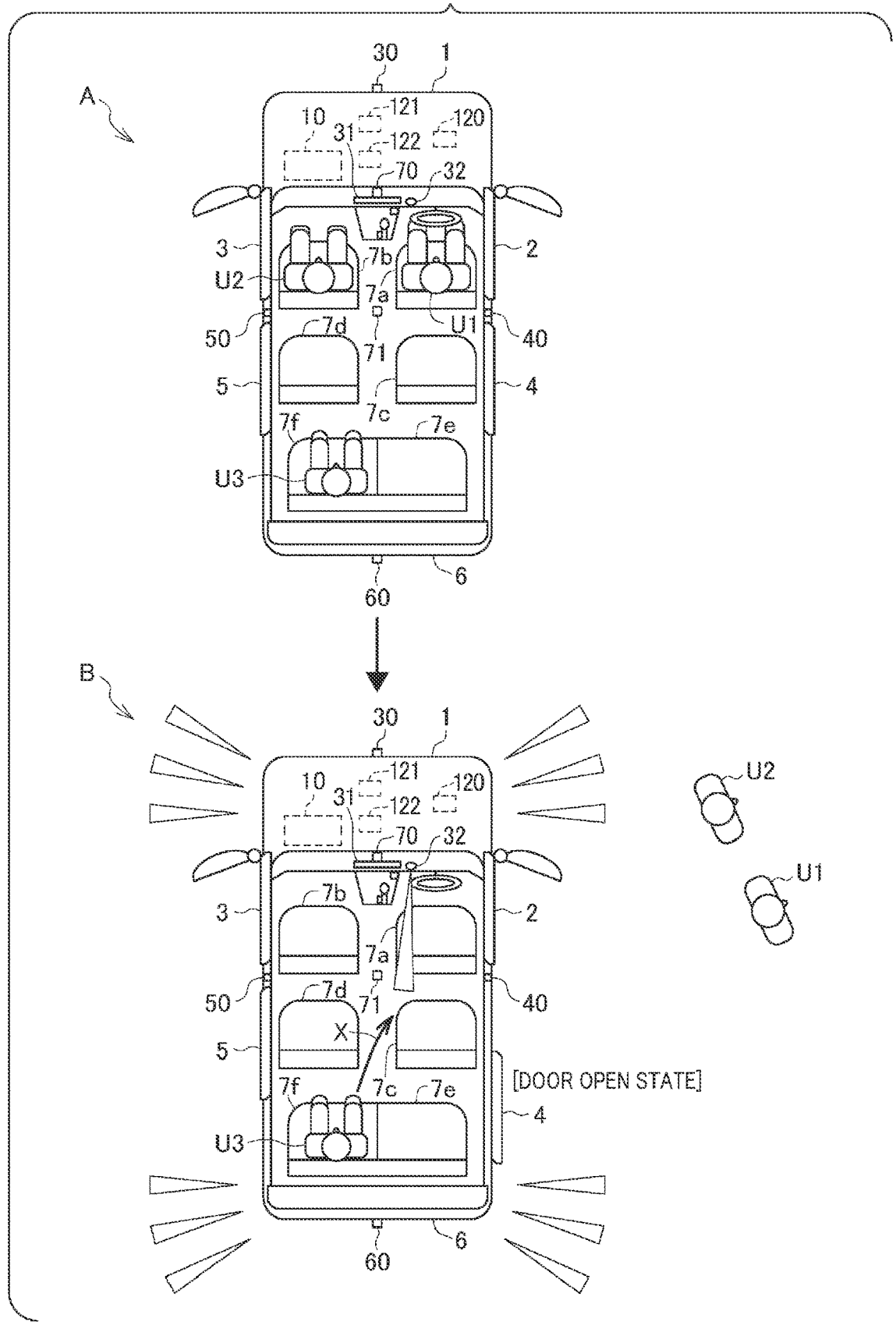
FIG. 5 is a diagram for explaining the first alarm control.

Reference numeral A in FIG. 5 shows a condition where the users U1 to U3 are seated in the driver seat 7a, the passenger seat 7b, and the third row left seat 7f in the vehicle 1, respectively, and reference numeral B in FIG. 5 shows a condition where the users U1 and U2 seated in the driver seat 7a and the passenger seat 7b leave the vehicle 1 from the condition shown by reference numeral A in FIG. 5, and the child user U3 is left in the vehicle 1. Whether or not such a condition shown by the reference numeral B in FIG. 5, that is, a condition where there is no other user near the child (user U3) in the vehicle 1 and the child (user U3) is likely to be left in the vehicle 1 (hereinafter this condition is referred to as "semi-leaving condition") is satisfied is determined in steps S1A and 2A.

The semi-leaving condition corresponds to "predetermined condition" of the present invention, step S1A corresponds to "vehicle peripheral condition recognition step" of the present invention, and step S2A corresponds to "in-vehicle condition recognition step" of the present invention.

In the semi-leaving condition as shown in the reference numeral B in FIG. 5 (YES in both steps S1A and S2A), the alarm control unit 16 shifts to the process of step S3A. In step S3A, the alarm control unit 16 determines, by the door open/close detection unit 14, whether or not one of the doors 2 to 5 is in the open state, and when the door is in the open state (step S3A; YES), the in-vehicle condition recognizing unit 12 determines whether or not the getting-off intention of the second user is recognized (step S4A). When the getting-off intention of the second user is recognized (step S4A; YES), the alarm control unit 16 immediately performs first alarm processing including an alarm directed to the second user (step S5A).

Steps S2A and S4A correspond to "in-vehicle condition recognition step" of the present invention, and step S3A corresponds to "door open/close detection step" of the present invention.

The alarm directed to the second user is an alarm given to prevent the second user from jumping out of the open door, and for example, an alarm is given to prevent the second user from jumping out of the open door by at least one of sound and display using the speaker 32 and the display 31. As a result, as shown in the reference numeral B in FIG. 5, when the user U3 in the vehicle starts to move toward the open door 4 along an arrow X (move from third seat row to second seat row), an alarm is given.

As described above, since the alarm is given to the second user at a timing when the getting-off intention of the second user is recognized, a situation where the second user jumps out of the vehicle can be effectively suppressed. In the first alarm processing of the present embodiment, an alarm directed to the first user is also given, and more specifically, the alarm is given by at least one of sound and light using the sound emitting unit 122 and the light unit 121 so that it turns out that the second user is present in the vehicle.

Referring back to FIG. 4, when all the doors 2 to 5 are in the close state (step S3A; NO), the alarm control unit 16 determines whether or not the doors 2 to 5 are in the locking state (step S7A). In the case of the locking state (step S7A; YES), second alarm processing including the alarm directed to the first user is performed (step S8A). Also, when the getting-off intention of the second user is not recognized in step S4A (step S4A; NO) and the doors 2 to 5 are closed and locked (step S6A; YES), the alarm control unit 16 performs the second alarm processing (step S8A).

Figure 6:
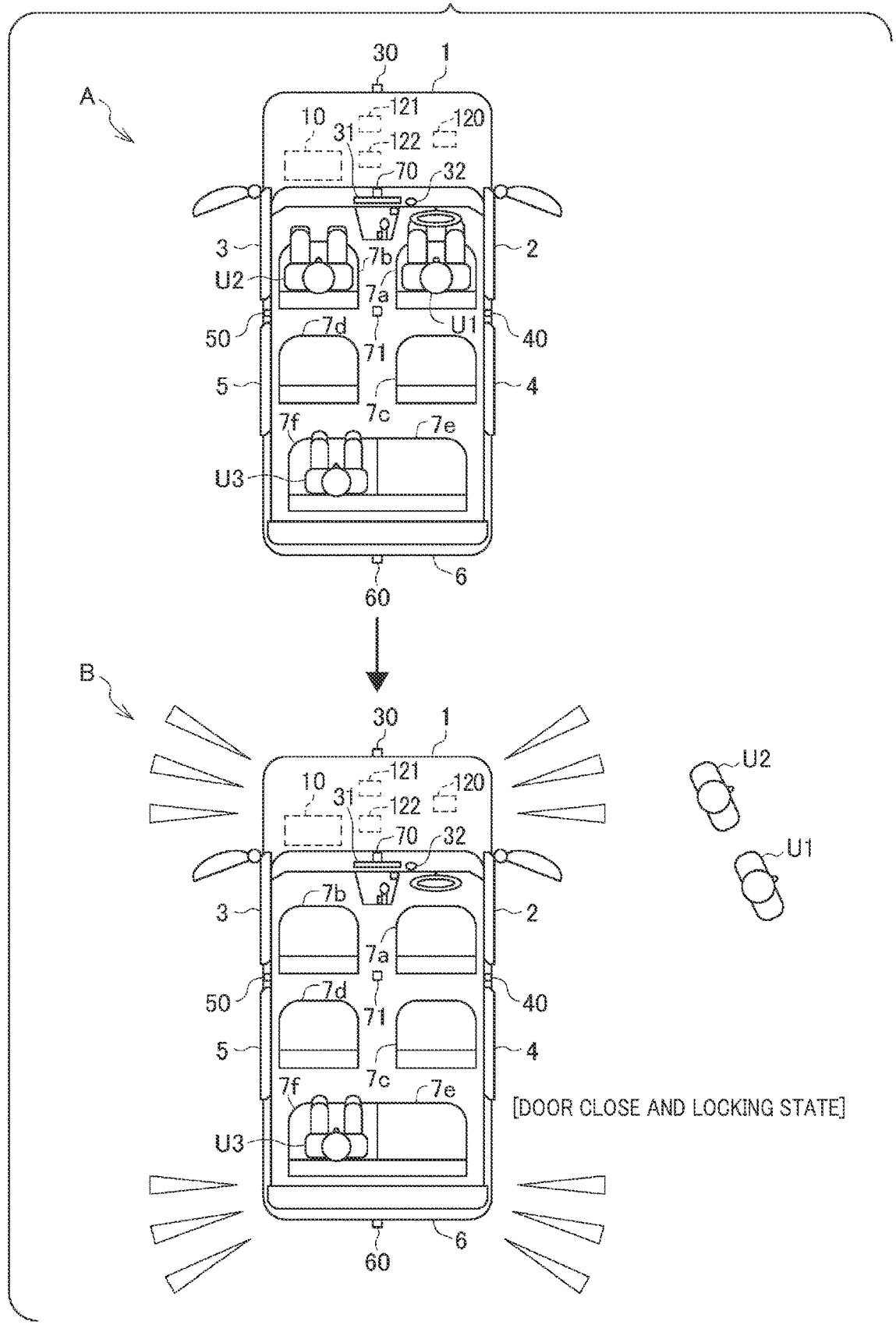
FIG. 6 is a diagram for explaining the first alarm control.

Reference numeral A in FIG. 6 shows a case in which the users U1 to U3 are seated in the driver seat 7a, the passenger seat 7b, and the third row left seat 7f in the vehicle 1, respectively, and reference numeral B in FIG. 6 shows a case in which the condition shown by the reference numeral A in FIG. 6 changes to the semi-leaving condition and the doors 2 to 5 are closed and are in the locking state. By the processes of steps S3A to S8A, as shown by the reference numeral B in FIG. 6, when it becomes difficult for the second user in the vehicle to move outside the vehicle and the second user is in a state of being highly likely to be left, the second alarm processing is executed.

In the second alarm processing, as the alarm directed to the first user, an alarm notifying that the second user is moved outside the vehicle is given, and for example, an alarm notifying that the door of the vehicle 1 is opened or that an occupant is left in the vehicle is given. For example, at least one of the sound emitting unit 122 and the light unit 121 is used to perform processing of notifying the outside of the vehicle of the above fact or notifying a portable terminal of a predetermined user of the above fact.

In the processing of notifying the portable terminal, when the first user specified by the in-vehicle condition recognizing unit 12 or the vehicle peripheral condition recognizing unit 13 is the regular user described in the user information 83 (see FIG. 3), contact information (for example, an e-mail address) of the first user is specified based on the user information 83, and by using the contact information, processing of notifying the portable terminal of the first user of a notification content is performed. As shown in FIG. 3, when the user information 83 stores information relating to an administrator (guardian) of the second user, processing of specifying contact information of the administrator of the second user and transmitting the notification content to the portable terminal of the administrator by using the contact information may be performed.

The second alarm processing may include the alarm directed to the second user in the vehicle. For example, in order to prevent the second user from panicking, by using at least one of the speaker 32 and the display 31, contents of a music piece or a moving image may be reproduced, or a predetermined message may be displayed.

After the alarm control unit 16 performs the second alarm processing, the alarm control unit 16 monitors whether or not the doors 2 to 5 are unlocked by the portable key 200 or the like (step S9A), and if the doors 2 to 5 are not unlocked (step S9A; NO), the alarm control unit 16 performs the second alarm processing (step S8A). Since the second alarm processing is continued until the doors 2 to 5 are unlocked, the situation where the second user in the vehicle is left is easily eliminated.

Figure 7:
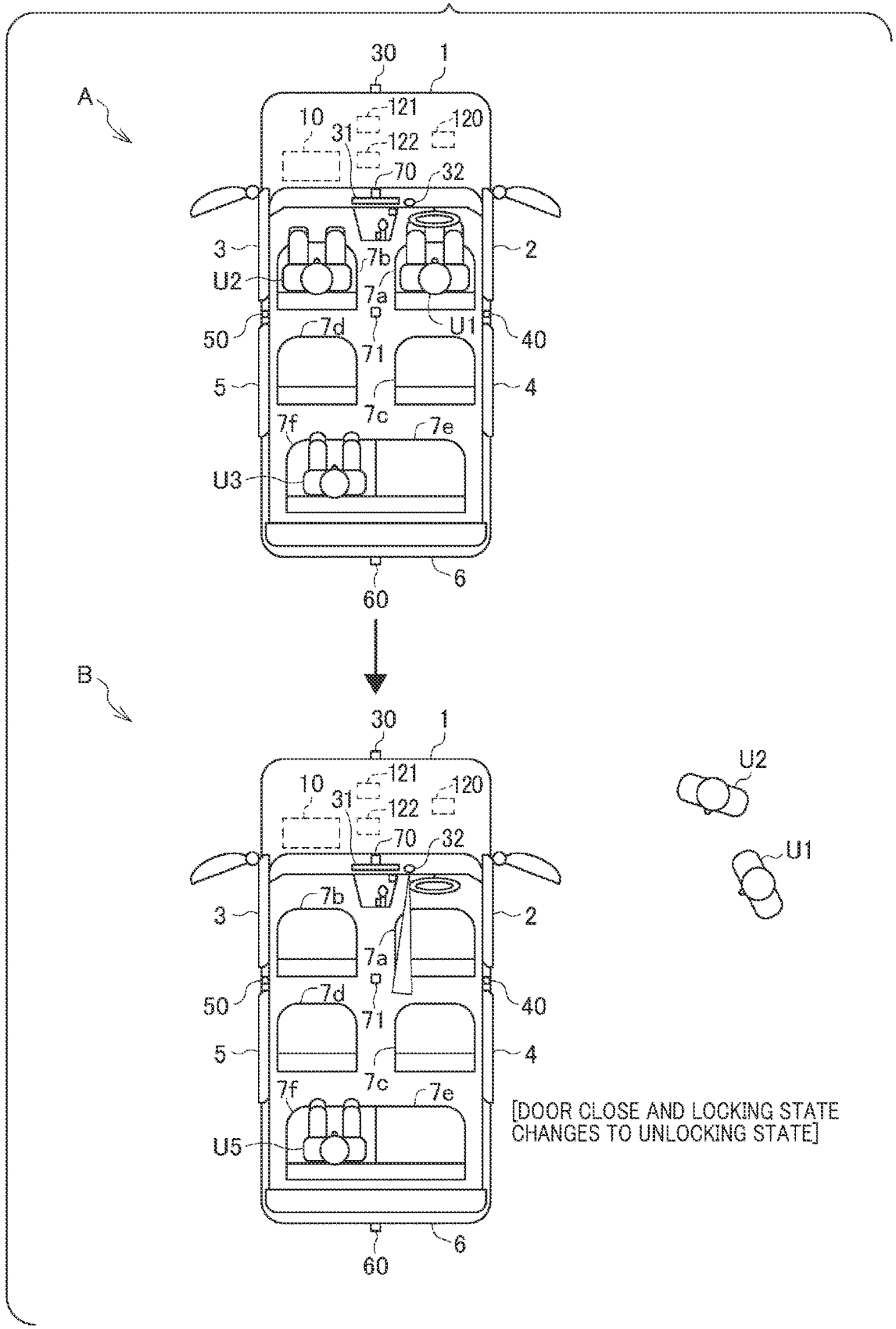
FIG. 7 is a diagram for explaining the first alarm control.

When the doors 2 to 5 are unlocked by the portable key 200 or the like (that is, the first user, etc.) (step S9A; YES), the alarm control unit 16 performs third alarm processing including the alarm directed to the second user (step S10A). Here, reference numeral A in FIG. 7 shows a case in which the users U1 to U3 are seated in the driver seat 7a, the passenger seat 7b, and the third row left seat 7f in the vehicle 1, respectively, and reference numeral B in FIG. 7 shows a case in which the condition shown by the reference numeral A in FIG. 7 changes to the semi-leaving condition, and the doors 2 to 5 are locked in the close state and then unlocked by the user U1. When the doors 2 to 5 are unlocked, the second user in the vehicle may suddenly open one of the doors 2 to 5 and jump out. In this configuration, by the processes of steps S9A to S10A, when the situation changes to the situation shown by the reference numeral B in FIG. 7, the third alarm processing is executed at a timing when the doors 2 to 5 are unlocked.

In the third alarm processing, as the alarm directed to the second user, a notification that provides information relating to the getting-off of the second user is performed, and, for example, processing of guiding the getting-off position set based on at least the recognition result of the vehicle peripheral condition recognizing unit 13 is performed on the second user. More specifically, processing is performed such that notification information for urging surrounding confirmation and getting off from the getting-off position is provided to the second user by using either the speaker 32 or the display 31, or when the second user is the regular user, processing is performed such that contact information (for example, an e-mail address) of the second user is specified based on the user information 83, and the notification information is transmitted to a portable terminal of the second user by using the contact information. When the presence of other vehicles adjacent to the getting-off position is specified based on the recognition result of the vehicle peripheral condition recognizing unit 13 or the like, it is preferable to provide notification of information for urging opening the door while paying attention to the other vehicles.

Instead of the processing of guiding the getting-off position, notification of opening a door or a window and staying in the vehicle, or an approach of an alarm target object 180 may be made.

Since the third alarm processing is performed on the second user at a timing when the states of the doors 2 to 5 are changed from the locking state to the unlocking state, an alarm can be given before the second user opens one of the doors 2 to 5, and a situation where the second user opens any door and jumps out can be effectively suppressed. Moreover, in the third alarm processing, the getting-off position set based on the recognition result of the vehicle peripheral condition recognizing unit 13 is guided, so that the second user can easily get off from the suitable getting-off position.

The third alarm processing may include an alarm directed to the first user outside the vehicle. For example, an electronic mail, the sound emitting unit 122, the light unit 121, or the like may be used to notify the first user of the information relating to the second user.

Referring back to FIG. 4, when one of the doors 2 to 5 is unlocked in step S7A (step S7A; NO), that is, when the closed doors 2 to 5 can be opened, the alarm control unit 16 performs second user alarm processing including the alarm directed to the second user (step S11A). In this condition (that is, the doors 2 to 5 are closed but unlocked), as compared with a condition where one of the doors 2 to 5 is opened (see reference numeral B in FIG. 5), it is relatively unlikely that the second user will jump out of the vehicle. Thus, in the second user alarm processing, the alarm is given to the second user at a timing later than the first alarm processing. For example, in the second user alarm processing, an alarm (alarm for preventing the second user from jumping out of the open door 4) with the same content as the first alarm processing is given at a timing when the second user moves to the vicinity of the door or at a timing when the second user puts the hand on the door. Thus, the alarm can be given at a timing when a possibility that the second user jumps out of the vehicle is increased.

Also in the second user alarm processing, the getting-off position set based on the recognition result of the vehicle peripheral condition recognizing unit 13 may be guided to the second user. The second alarm processing may include the alarm directed to the first user outside the vehicle. For example, an electronic mail, the sound emitting unit 122, the light unit 121, or the like may be used to notify the first user of the information relating to the second user. The steps S4A, S8A, S10A, and S11A correspond to the "alarm control step" of the present invention.

Figure 8:
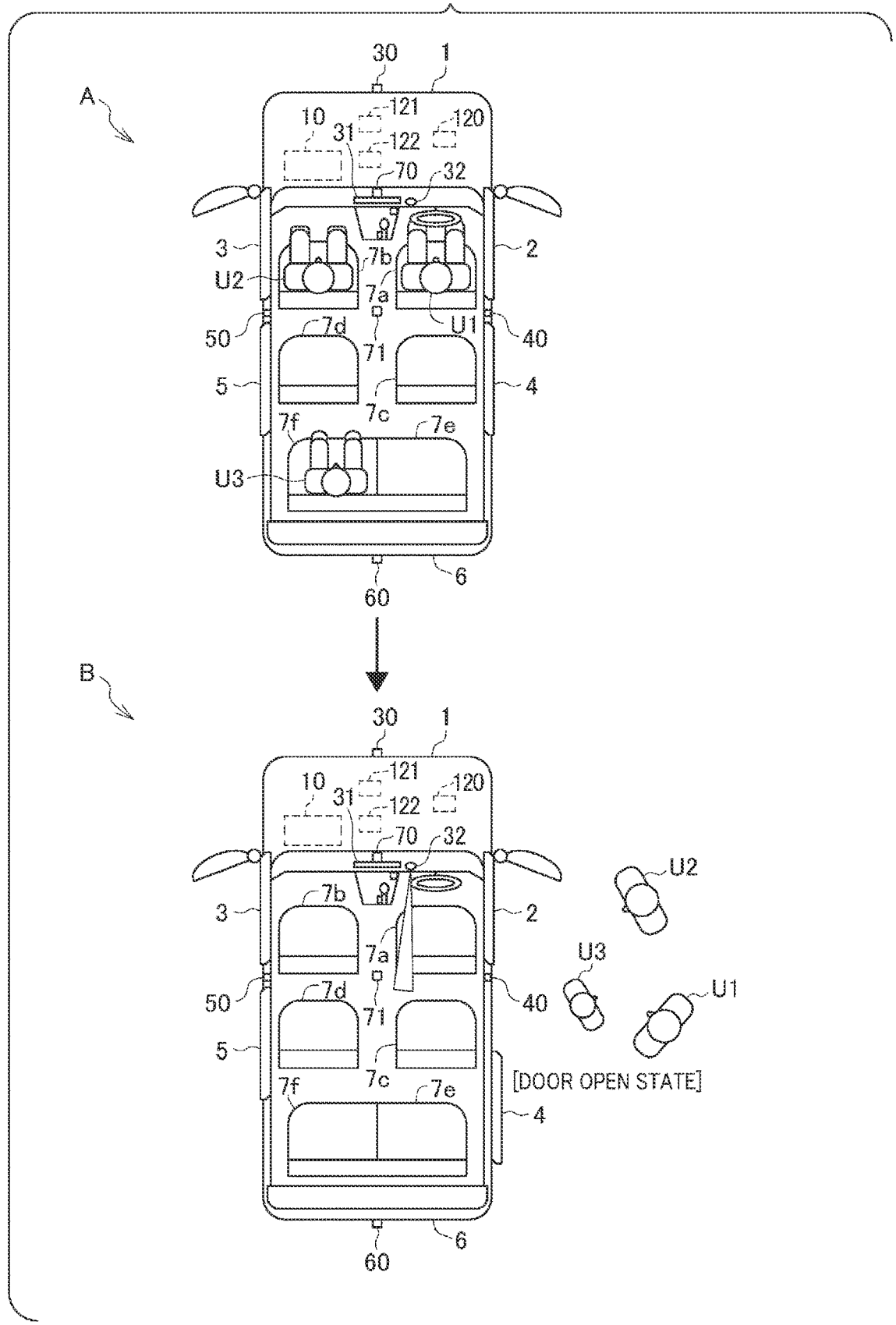
FIG. 8 is a diagram for explaining the first alarm control.

On the other hand, when it is determined in step S2A that the second user is not present in the vehicle 1 (step S2A; NO), the alarm control unit 16 does not give an alarm to the first user and the second user. Here, reference numeral A in FIG. 8 shows a case where the users U1 to U3 get on the vehicle, and reference numeral B in FIG. 8 shows a case where all the users U1 to U3 move outside the vehicle from the condition shown by the reference numeral A in FIG. 8. In this case, since the result of step S2A is negative, an alarm is not given, and an unnecessary alarm is avoided.

[4. Second Alarm Control]

Figure 9:
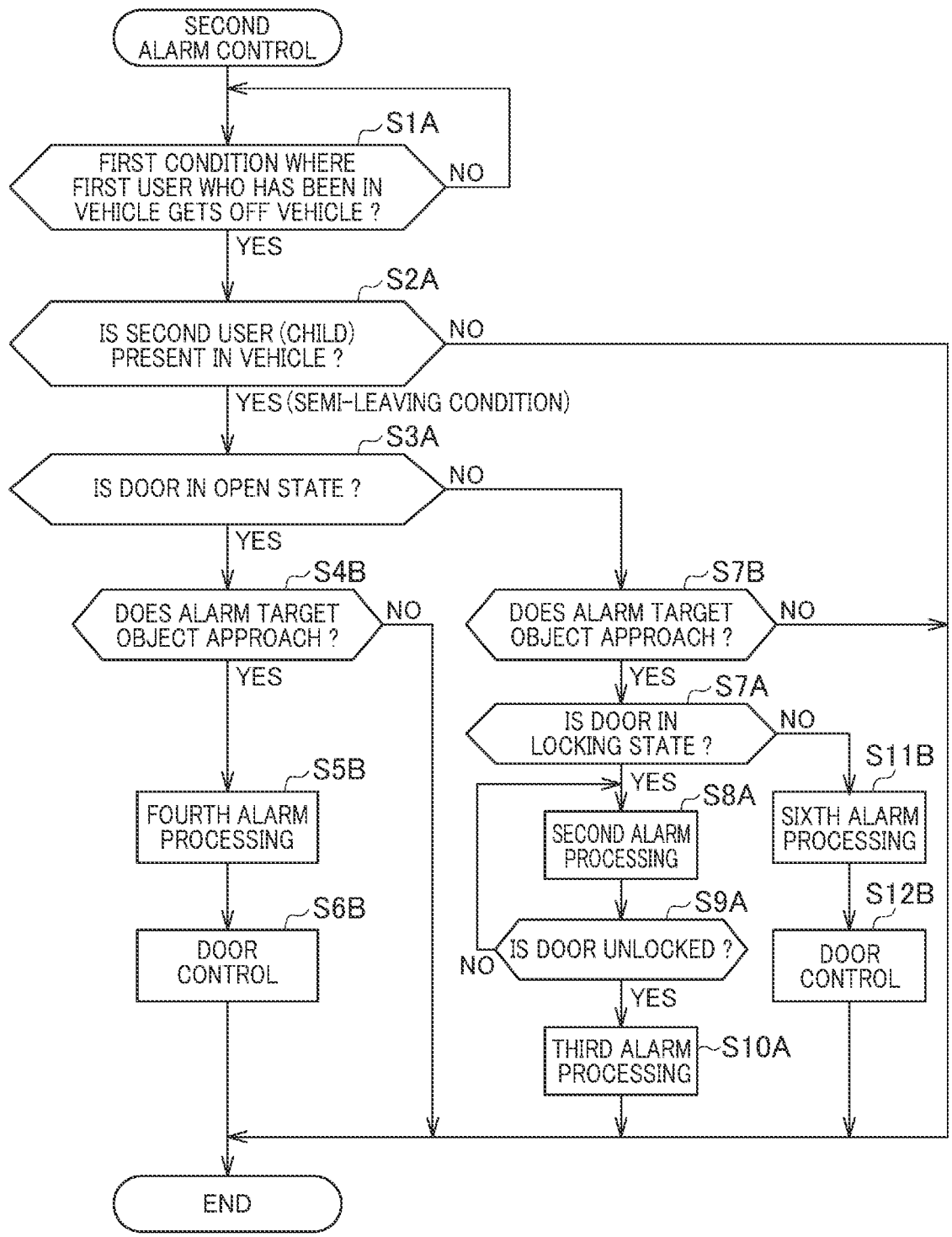
FIG. 9 is a flowchart showing a second alarm control.
Figure 10:
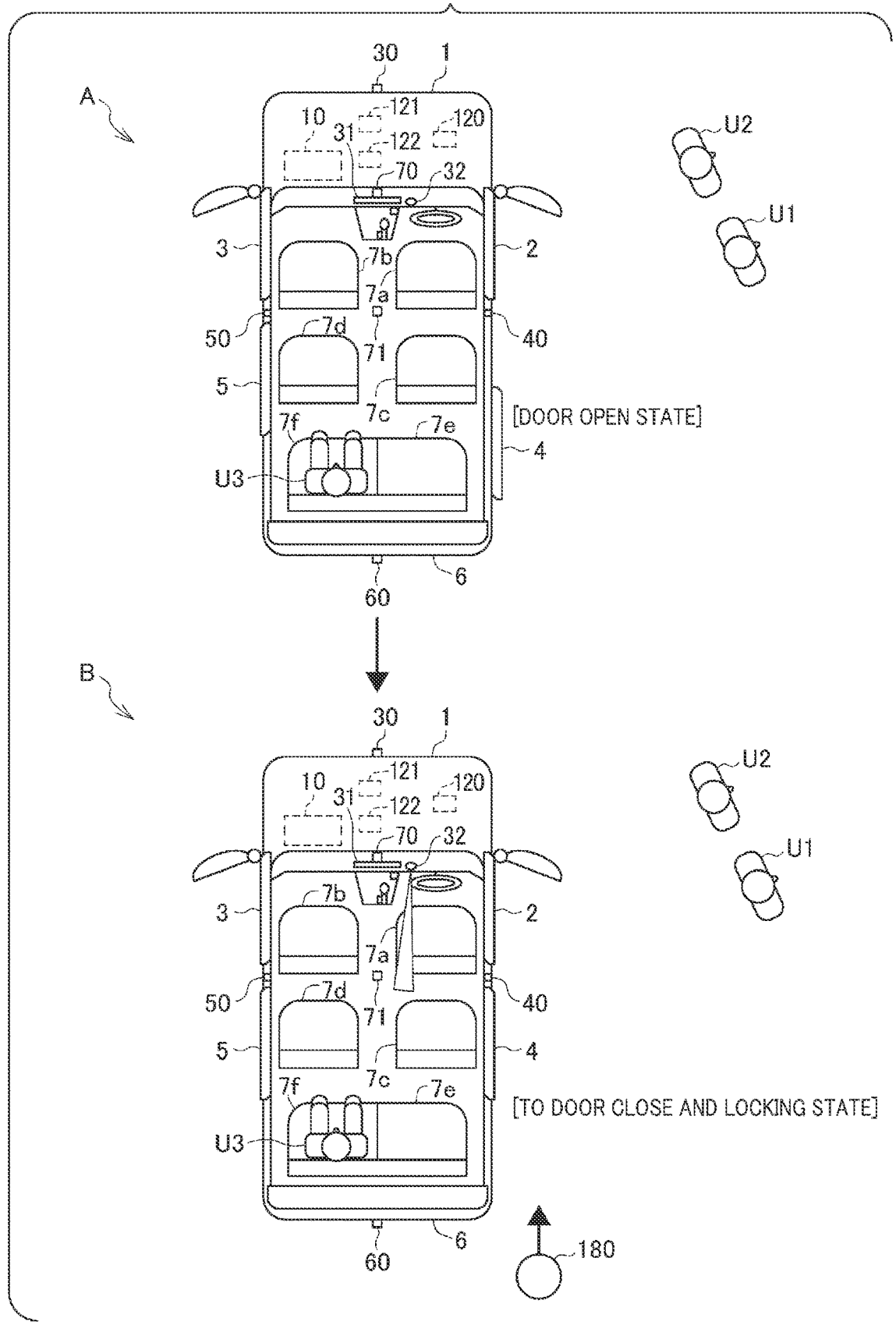
FIG. 10 is a diagram for explaining the second alarm control.

FIG. 9 is a flowchart showing the second alarm control. Steps similar to those of the first alarm control are denoted by the same reference numerals, and duplicate description thereof will be omitted. FIG. 10 is a diagram for explaining the second alarm control.

When the vehicle peripheral condition recognizing unit 13 recognizes the first condition where the first user who has been in the vehicle 1 leaves the vehicle 1 (step S1A; YES), when the in-vehicle condition recognizing unit 12 recognizes the condition where the second user is present in the vehicle 1 (step S2A; YES), and when the door open/close detection unit 14 determines that one of the doors 2 to 5 is in the open state, the alarm control unit 16 executes the process of step S4B.

In step S4B, the alarm control unit 16 determines whether or not the approach of the alarm target object is detected by the approach detection part 13B. Here, reference numeral A in FIG. 10 shows a condition where the users U1 and U2 seated in the driver seat 7a and the passenger seat 7b leave the vehicle 1, the child user U3 is left in the vehicle 1, and the door 4 is opened. Reference numeral B in FIG. 10 shows a condition where the alarm target object 180 approaches the vehicle 1 in the condition shown by the reference numeral A in FIG. 10.

In the condition shown by the reference numeral B in FIG. 10 (step S4B; YES), as shown in FIG. 9, the alarm control unit 16 performs fourth alarm processing corresponding to the approach (step S5B) and also performs door control corresponding to the approach (step S6B).

In the fourth alarm processing, an alarm is given to prevent the situation where the second user (user U3 in FIG. 10) jumps out of the opened door (door 4 in FIG. 10), and, for example, by at least one of sound and display using the speaker 32 and the display 31, the alarm is given to prevent the situation where the second user jumps out of the opened door. The door control in step S6B includes control that closes the opened door (door 4 in FIG. 10) by the door control unit 15, and, for example, after the door control unit 15 closes the doors 2 to 5, all the doors 2 to 5 are caused to be locked.

That is, in the semi-leaving condition where there is no other user near the child (user U3) in the vehicle 1 and the child (user U3) is likely to be left in the vehicle 1, the alarm is given to the second user at a timing when the approach of the alarm target object 180 is detected, and the opened door is closed. Thus, the situation where the second user jumps out of the opened door can be effectively suppressed. When the door control in step S6B includes control for maintaining the state of the window of each of the doors 2 to 5 in the close state or a slightly open state, ventilation may be enabled while preventing the second user from extending the hand from the window.

In step S3A, when all of the doors 2 to 5 are in the close state (step S3A; NO), when the approach of the alarm target object 180 is detected by the approach detection part 13B (step S7B; YES), and when the doors 2 to 5 are in the locking state (step S7A; YES), the alarm control unit 16 performs the second alarm processing including the alarm directed to the first user (step S8A). In the second alarm processing, the alarm notifying that the second user is to be moved outside the vehicle is given to the first user. Since the doors 2 to 5 are in the locking state, the situation where the second user jumps out of the vehicle is suppressed.

The second alarm processing may include the alarm directed to the second user in the vehicle, and, for example, an alarm may be given to make notification of the approach of the alarm target object 180 or the fact that the door is not unlocked. In addition to the second alarm processing, control may be performed to maintain the window of the open door in the close state or the slightly open state.

After the second alarm processing, when the doors 2 to 5 are unlocked by the portable key 200 or the like (step S9A; YES), the alarm control unit 16 performs the third alarm processing including the alarm directed to the second user (step S10A). Since the third alarm processing provides the second user with information such as the processing of guiding the getting-off position set based on the recognition result of the vehicle peripheral condition recognizing unit 13 or notification that the user stays in the vehicle, an alarm to avoid the alarm target object 180 can be given. The third alarm processing may include an alarm directed to the first user outside the vehicle.

When one of the doors 2 to 5 is unlocked in step S7A of FIG. 9 (step S7A; NO), the alarm control unit 16 performs sixth alarm processing corresponding to the approach of the alarm target object 180 (step S11B) and also performs door control corresponding to the approach (step S12B).

In the sixth alarm processing, an alarm is given to prevent the second user from opening the door, and, for example, the alarm is given to prevent the door from opening at a timing when the second user moves to the vicinity of one of the doors 2 to 5 or at a timing when the second user puts the hand on the doors 2 to 5. Thus, the alarm can be given at the timing when the possibility that the second user jumps out of the vehicle is increased, and in other words, when the second user does not intend to open the door, a situation of giving an unnecessary alarm can be avoided. Instead of the method of giving the alarm to prevent the second user from opening the door, notification of opening the door or the window and staying in the vehicle, or the approach of the alarm target object 180 may be made. The sixth alarm processing may include the alarm directed to the first user outside the vehicle.

The door control in step S12B includes a control in which the door control unit 15 locks all the doors 2 to 5. Thus, the situation where the second user opens one of the doors and jumps out of the vehicle can be effectively suppressed. The door control in step S12B may include the control for maintaining the state of the window of each of the doors 2 to 5 in the close state or the slightly open state.

On the other hand, when it is determined in step S2A that the second user is not present in the vehicle 1 (step S2A; NO), or the approach of the alarm target object 180 is not detected (step S4B or S7B; YES), the alarm control unit 16 does not give an alarm to the first user and the second user. This can avoid an unnecessary alarm.

As described above, in the vehicle control system 100, in the semi-leaving condition where the vehicle peripheral condition recognizing unit 13 recognizes a condition where the first user who has been in the vehicle 1 leaves the vehicle 1 and where the in-vehicle condition recognizing unit 12 recognizes a condition where the second user is present in the vehicle 1, the alarm control unit 16 performs alarm processing on at least one of inside the vehicle and outside the vehicle by using the notification function according to one of the speaker 32, the display 31, the light unit 121, and the sound emitting unit 122 according to a detection result of the door open/close detection unit 14. Thus, in a situation where the second user in the vehicle is likely to be left when the first user gets off the vehicle, a suitable alarm can be easily given according to ease of the second user to jump out of the vehicle, which differs depending on the open/close states of the doors 2 to 5.

The alarm control unit 16 performs the first alarm processing including the alarm directed to the second user when, in the semi-leaving condition, the door open/close detection unit 14 detects that one of the doors 2 to 5 is in the open state and the getting-off intention recognizing part 12B recognizes the getting-off intention of the second user. Thus, it becomes possible to give an alarm corresponding to a situation where the second user can jump out of the door in the open state.

The alarm control unit 16 performs the second alarm processing including the alarm directed to the first user when, in the semi-leaving condition, the door open/close detection unit 14 detects that the doors 2 to 5 are in the close state and the locking state detection part 12C detects that the doors 2 to 5 are in the locking state. Thus, it becomes possible to give an alarm corresponding to a situation where the second user is highly likely to be left in the vehicle.

In addition, the alarm control unit 16 performs the third alarm processing including the alarm directed to the second user when, in the semi-leaving condition, the door open/close detection unit 14 detects that the doors 2 to 5 are in the close state and the locking state detection part 12C detects that the states of the doors 2 to 5 are changed from the locking state to the unlocking state. Thus, it becomes possible to give an alarm corresponding to a condition where the second user is highly likely to jump out at the timing of unlocking. The third alarm processing includes the processing of guiding, to the second user, the getting-off position set based on the recognition result of the vehicle peripheral condition recognizing unit 13, so that the second user can easily get off from the suitable getting-off position.

The vehicle control system 100 further includes the door control unit 15 that controls the operating components associated with the doors 2 to 5, and in the second alarm control, in the semi-leaving condition, when the approach of the alarm target object 180 is detected by the vehicle peripheral condition recognizing unit 13, the alarm control unit 16 performs the fourth alarm processing corresponding to the approach, and the door control unit 15 controls the doors 2 to 5 to at least one of the close state and the locking state. Thus, when the alarm target object 180 approaches, it is possible to take appropriate measures to regulate the jumping out of the second user.

Also in the first alarm control, when the approach of the alarm target object 180 is detected in the semi-leaving condition, the door control unit 15 may control the doors 2 to 5 to at least one of the close state and the locking state.

The present invention is not limited to the configuration of the above embodiment, and can be practiced in various embodiments without departing from the gist thereof.

For example, in the first alarm control and the second alarm control, the case where each alarm processing is performed regardless of whether or not the first user and the second user are the regular users registered as the users of the vehicle 1 has been mentioned. However, each alarm processing may be performed only when both or one of the first user and the second user is the regular user.

In the above embodiment, the case where the present invention is applied to the vehicle control system 100 shown in FIG. 1, etc. and the vehicle control method has been described, but the present invention is not limited thereto. For example, part of the processing of the vehicle control system 100 may be performed by another device such as a server connected to the vehicle control device 10 via a communication network. For example, among the first alarm control and the second alarm control, processing (for example, processing performed by the in-vehicle condition recognizing unit 12 and the vehicle peripheral condition recognizing unit 13) having a relatively large calculation amount is performed by a server, whereby the calculation amount of the vehicle control device 10 can be reduced, and higher accurate user recognition and action recognition can be easily adopted.

The configuration of each component shown in FIG. 2 may be realized by hardware or by cooperation of hardware and software. The way of division of processing units of each flowchart and the processing order are not limited to the illustrated example.

The control program 81 may be stored in an external device or a device and acquired via the communication unit 120 and the like. The control program 81 may be stored on a recording medium stored in a computer-readable manner. As the recording medium, a magnetic or optical recording medium or a semiconductor memory device can be used. Specifically, examples of the recording medium include a portable type or fixed type recording medium such as a flexible disk, various optical disks, a magneto-optical disk, a flash memory, and a card type recording medium. Further, the recording medium may be a nonvolatile storage device such as a RAM, a ROM, or an HDD which is an internal storage device included in an image display device.

REFERENCE SIGNS LIST

1 Vehicle
2 Right power hinged door
3 Left power hinged door
4 Right power slide door
5 Left power slide door
6 Power tail gate
10 Vehicle control device
11 Key authentication unit
12 In-vehicle condition recognizing unit
12A In-vehicle user/action recognizing part
12B Getting-off intention recognizing part
12C Locking state detection part
13 Vehicle peripheral condition recognizing unit
13A Off-vehicle user/action recognizing part
13B Approach detection part
14 Door open/close detection unit
15 Door control unit
16 Alarm control unit
30 Front camera (off-vehicle photographing camera)
32 Speaker
40 Right side camera (off-vehicle photographing camera)
50 Left side camera (off-vehicle photographing camera)
60 Rear camera (off-vehicle photographing camera)

70 Front seat camera (in-vehicle photographing camera)
71 Rear seat camera (in-vehicle photographing camera)
80 Memory
81 Control program
83 User Information
84 Alarm information
100 Vehicle control system
120 Communication unit (Communication part and notification unit)
121 Light unit (notification unit)
122 Sound emitting unit (notification unit)
130 Navigation device
150 Battery
180 Alarm target object
U1, U2 User (first user)
U3 User (second user)

What is claimed is:

1. A vehicle control system that controls operation of a vehicle having a notification function, the vehicle control system comprising a processor, wherein the processor:
recognizes a condition around the vehicle;
recognizes a condition inside the vehicle;
detects an open/close state of a door of the vehicle;
performs alarm processing on at least one of inside the vehicle and outside the vehicle by using the notification function according to a detection result of whether or not the door is open so that a second user can get off in a predetermined condition where a condition where a first user who has been in the vehicle leaves the vehicle is recognized and where a condition where the second user is present in the vehicle is recognized;
recognizes a getting-off intention of the second user in the vehicle when it is recognized from a captured image of a camera provided in the vehicle that a line of sight of the second user is directed toward an open door among a plurality of doors and an action toward the door toward which the line of sight is directed by the second user is recognized; and
in the predetermined condition, when the door is detected as open and when the getting-off intention of the second user from the open door is recognized, performs first alarm processing including an alarm, to prevent the second user from jumping out of the open door, directed to the second user.

2. The vehicle control system according to claim 1, wherein the processor
detects locking/unlocking of the door, and
in the predetermined condition, when the door is detected as closed and when the door is detected as locked, the processor performs second alarm processing including an alarm, to notify to make the second user move outside the vehicle, directed to the first user.

3. The vehicle control system according to claim 2, wherein the processor
in the predetermined condition, when the door is detected as closed and when a locking state of the door is changed from the locking state to an unlocking state, performs third alarm processing including the alarm, to provide information regarding getting off, directed to the second user.

4. The vehicle control system according to claim 3, wherein
the third alarm processing includes processing of guiding, to the second user, a getting-off position set based on at least a recognition result of a vehicle peripheral condition.

5. The vehicle control system according to claim 3, wherein the processor
communicates with a portable terminal of the second user, and wherein
the second alarm processing or the third alarm processing includes processing of transmitting alarm information to the portable terminal of the second user.

6. The vehicle control system according to claim 1, wherein the processor
controls an operating component associated with the door, and
in the predetermined condition, when an approach of an alarm target object is detected by the recognition result of a vehicle peripheral condition, performs fourth alarm processing corresponding to the approach to prevent the second user from jumping out of the open door, and controls the door to at least one of a closed state and a locked state.

7. A vehicle control method executed by a computer to control operation of a vehicle having a notification function, the vehicle control method comprising:
a vehicle peripheral condition recognition step of recognizing a condition around the vehicle by a processor of the computer;
an in-vehicle condition recognition step of recognizing a condition inside the vehicle by the processor;
a door open/close detection step of detecting an open/close state of a door of the vehicle by the processor; and
an alarm control step of performing alarm processing, by the processor, on at least one of inside the vehicle and outside the vehicle by using the notification function according to a detection result of the door open/close detection step in a predetermined condition where a condition where a first user who has been in the vehicle leaves the vehicle is recognized in the vehicle peripheral condition recognition step and where a condition where a second user is present in the vehicle is recognized in the in-vehicle condition recognition step, wherein
the in-vehicle condition recognition step includes recognizing a getting-off intention of the second user in the vehicle when it is recognized from a captured image of a camera provided in the vehicle that a line of sight of the second user is directed toward an open door among a plurality of doors and an action toward the door toward which the line of sight is directed by the second user is recognized; and
the alarm control step includes, in the predetermined condition, when the door is detected as open and when the getting-off intention of the second user from the open door is recognized, performing first alarm processing including an alarm, to prevent the second user from jumping out of the open door, directed to the second user.

* * * * *